United States Patent
Knopf

(10) Patent No.: US 7,170,468 B2
(45) Date of Patent: Jan. 30, 2007

(54) COLLABORATIVE TABLET COMPUTER

(75) Inventor: Eric Andrew Knopf, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 1074 days.

(21) Appl. No.: 09/788,636

(22) Filed: Feb. 21, 2001

(65) Prior Publication Data

US 2002/0113751 A1 Aug. 22, 2002

(51) Int. Cl.
*G09G 5/00* (2006.01)

(52) U.S. Cl. .................. 345/1.3; 345/1.1; 345/169; 345/173; 345/903; 361/625

(58) Field of Classification Search ........ 345/169, 345/173, 179, 903, 1.1, 1.3; 361/625, 680, 361/684; 341/20
See application file for complete search history.

(56) References Cited

U.S. PATENT DOCUMENTS

| | | | | |
|---|---|---|---|---|
| 4,760,388 A | | 7/1988 | Tatsumi et al. | 340/17 |
| 4,800,376 A | | 1/1989 | Suga et al. | 340/721 |
| 4,884,068 A | | 11/1989 | Matheny et al. | 340/707 |
| 5,275,565 A | | 1/1994 | Moncrief | 434/29 |
| 5,467,102 A | * | 11/1995 | Kuno et al. | 345/1 |
| 5,574,625 A | * | 11/1996 | Ohgami et al. | 361/684 |
| 5,661,531 A | | 8/1997 | Greene et al. | 349/73 |
| 5,790,371 A | * | 8/1998 | Latocha et al. | 345/1 |
| 5,805,117 A | | 9/1998 | Mazurek et al. | 345/1 |
| 5,838,405 A | | 11/1998 | Izumi et al. | 349/73 |
| 5,903,328 A | | 5/1999 | Greene et al. | 349/73 |
| 5,956,046 A | | 9/1999 | Kehlet et al. | 345/502 |
| 6,002,581 A | * | 12/1999 | Lidsey | 361/680 |
| 6,011,545 A | * | 1/2000 | Henderson et al. | 345/173 |
| 6,115,883 A | * | 9/2000 | Um | 361/625 |
| 6,476,733 B1 | * | 11/2002 | Amiri | 341/20 |

FOREIGN PATENT DOCUMENTS

| | | |
|---|---|---|
| JP | 04-359358 | 12/1992 |
| JP | 05-249934 | 9/1993 |
| JP | 06-035642 | 2/1994 |
| JP | 08-044672 | 2/1996 |
| JP | 09-026769 | 1/1997 |
| JP | 09-258705 | 10/1997 |

(Continued)

*Primary Examiner*—Bipin Shalwala
*Assistant Examiner*—David L. Lewis
(74) *Attorney, Agent, or Firm*—Lacasse & Associates, LLC; Randy W. Lacasse; Ramraj Soundararajan

(57) ABSTRACT

A section of a housing on a portable computing device is removed or folded away, thereby exposing a free edge of an LCD screen as well as electrical (data and power) connectors and structural connectors. Connectors are placed symmetrically across the exposed edge whereby a male connector on one side mates with a female connector on the other device. Two such devices are physically pushed together, with locking catches securing the two devices together. Upon docking, the two devices recognize the new configuration and re-map the desktop area of the display into a single display for the combined device. In a preferred embodiment, either a top edge or a side edge is selectively exposed independently on the same device, to mate two devices in either a portrait or landscape orientation.

18 Claims, 7 Drawing Sheets

Angled View: Docking

FOREIGN PATENT DOCUMENTS

| | | |
|---|---|---|
| JP | 10-133782 | 5/1998 |
| JP | 11-073153 | 3/1999 |
| JP | 2000 181872 | 6/2000 |
| JP | 2000-242248 | 9/2000 |
| JP | 2000-250501 | 9/2000 |

* cited by examiner

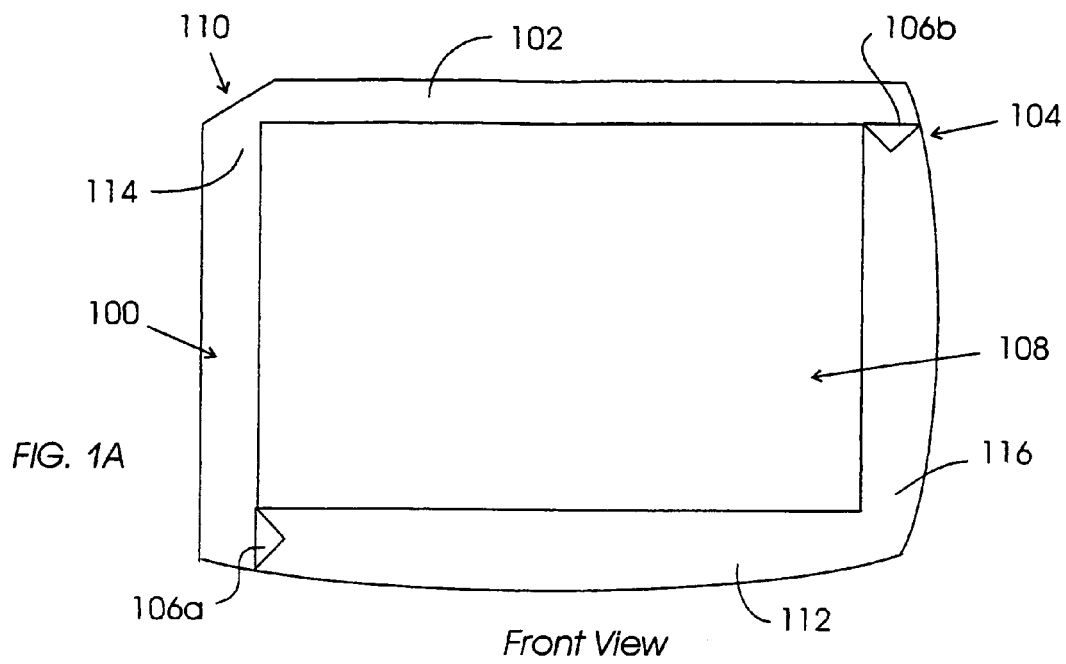
FIG. 1A  Front View
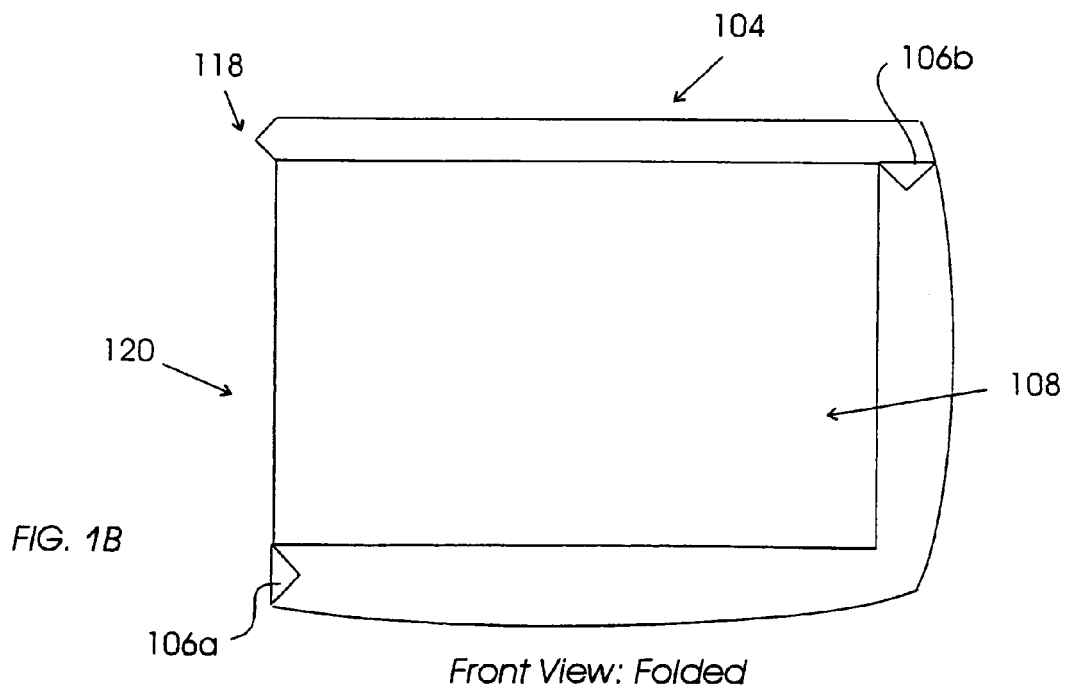
FIG. 1B  Front View: Folded

Back View

Back View: Folded

Angled View: Docking

Landscape Orientation

Portrait Orientation

PDA Concepts

COLLABORATIVE TABLET COMPUTER

BACKGROUND OF THE INVENTION

1. Field of Invention

The present invention relates generally to the field of "tablet" form-factor digital devices. More specifically, the present invention is related to a modified "tablet" form-factor digital device which can physically "dock" with like devices to create a larger, more capable device.

2. Discussion of Related Art

A tablet form factor is a "single slab" device which generally does not have a hinged keyboard section (in comparison to a notebook computer), but is essentially a screen device with some sort of touch screen as the primary input. Current examples on the market are the Fujitsu "Stylistic" series of tablet computers (representing Win9x devices), and at a smaller scale, Palm Pilot and handheld WinCE devices.

Many times, work utilizing such tablet form factor devices involves two or more people in immediate proximity to each other collaborating on some task which involves the use of such devices. In most collaborative environments such as this, the devices are digitally linked in some manner (IR, radio, ethernet) where data is shared on a "virtual whiteboard". This whiteboard displays redundant, identical information on each device, which each user can thereby modify independently on their own device.

In these cases, the additional display, and essentially the entire hardware of the additional devices, are wasted due to their redundancy. In addition, portable products generally make sacrifices in screen area and hardware capability for the tradeoff of increased portability (smaller size and weight). Significant disadvantages result by failing to combine the resources, such as the displays, of each device in scenarios such as this.

The technique of "tiling" CRT or LCD displays has been demonstrated before, however, all efforts have focused on creating a large, permanent, single purpose display. The driving reason behind such techniques is to create a lower-cost tiled display (due to economies of scale of smaller displays) in comparison to a single display of comparable size. Two companies which have been working in this area are Sharp Corp. and Rainbow Displays, Inc.

The following US patents describe methods for tiling LCD screens together or the displaying of an image on multiple synchronized display units: U.S. Pat. Nos. 4,760,388; 4,800,376; 4,844,068; 5,275,565; 5,661,531; 5,805,117; 5,838,405; 5,903,328; and 5,956,046.

Whatever the precise merits, features and advantages of the above cited references, none of them achieve a collaborative environment wherein a modular display and computing device can be increased and decreased in size and function in response to the task at hand.

SUMMARY OF THE INVENTION

One or more sections on a housing of a portable computing device are selectively removed or folded away, thereby exposing a free edge of the display screen as well as electrical connectors and structural connectors. Two or more such devices are docked utilizing the exposed connectors such that the exposed screen edges abut. Upon docking, the devices recognize the new configuration and re-map the desktop area of the display into a single display for the combined device.

One embodiment of the present invention allows either, or both, the top edge or side edge of the housing to be simply pivoted underneath the device to expose the edge of the device screen. Electrical and structural connectors are exposed as well. The edges of the device are sharply angled, allowing the edge of the device to pivot under itself without adding any substantial thickness to the device. The two folding side sections are split at a 45 degree angle, allowing for independent rotation of the sections, while still providing the maximum potential protection to the screen edge. When one side is folded down, the other edge extends beyond the screen edge, and therefore must be accommodated for in the mating device with a corresponding cut-out area. These male and female shapes provide the added advantage of a visual cue as to how the two devices connect.

Additionally, in another embodiment, other computing resources, such as RAM and CPU cycles, are shared when two such devices are docked.

BRIEF DESCRIPTION OF THE DRAWINGS

FIG. 1a illustrates a front plan view of an embodiment of the present invention.

FIG. 1b illustrates a front plan view of an embodiment of the present invention with one edge folded.

DESCRIPTION OF THE PREFERRED EMBODIMENTS

Figure 2A:
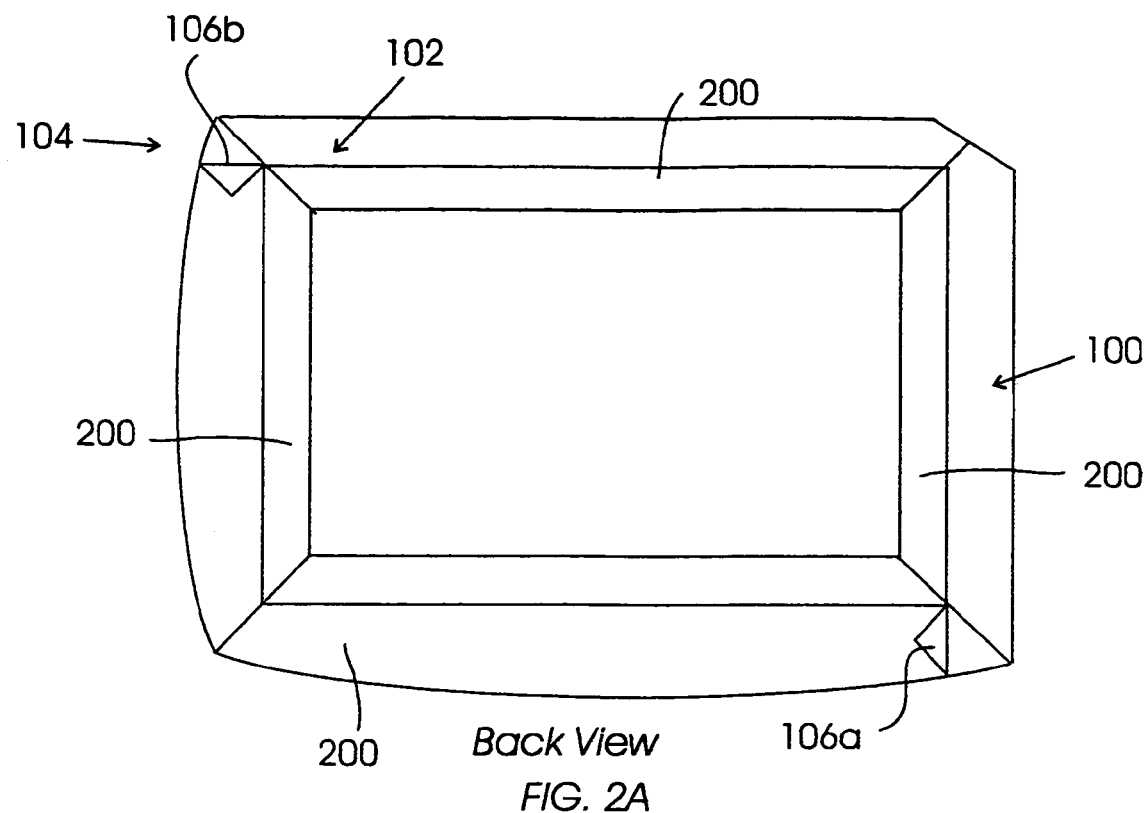
FIG. 2a illustrates a back plan view of an embodiment of the present invention.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

As part of the present invention a housing/mechanism for a tablet form-factor computing device allows the edge of the device's display to be exposed. Once exposed, the display may be abutted to another like display on a like device to create a larger display meta-device.

One realization of the present invention is a device where just a single side of the device pivots. Although easier to implement, however, it limits the combined screen configuration to a single aspect ratio. With the advent of new low-temperature polysilicon LCD displays, LCD screens only need two edges of the display connected to driver circuitry, allowing two sides to be totally free of physical features that would prevent the abutment of the screens. When designed such that two sides can pivot, two aspect ratios can be created, 1) a long and thin landscape view, and 2) a more square portrait view, allowing for a choice of formats that will best fit the shape of the displayed data. In addition, by allowing more than one side to pivot, more than two such devices can be joined, allowing for a much larger combined display and computing power FIG. 1a illustrates a front view of an embodiment of the present invention. Tablet device 104 comprises a display 108 and a plurality of edges 100, 102, 112, and 116. Two of the edges 100, 102 are capable of being folded towards the back surface of the device such that the device is able to be docked with a similar device in two orientations, landscape or portrait, dependent upon which side is pivoted. Or, rather than just providing for two orientations, both sides are pivoted at the same time allowing more than two such devices to be combined. Edges 112, 116 are stationary and extend along perpendicularly oriented sides of the device while edges 100, 102 extend along the other perpendicularly oriented sides of the device. At the point where foldable edges 100, 102 meet 110, edges 100, 102 are split at a 45 degree angle 114. In addition, the corner where edges 100, 102 meet 110 is shaped rather than rectangular to provide male physical forms when one of edges 100, 102 are folded towards the back surface of the device. The ends of stationary edges 112, 116 which meet with foldable edges 100, 102 are provided with docking cutouts 106a, 106b so as to provide female forms when one of edges 100, 102 are folded towards the back surface of the device. The use of movable edge sections 100, 102 is advantageous as they provide protection to the connectors and the edge of the display which are exposed when the device is to be mated with a similar device.

As illustrated in FIG. 1b, when one of the foldable edges, in this illustration edge 100, is folded under, a male docking edge point 118 extending beyond the edge of LCD screen and female docking cutout 106a are exposed such that they may be mated with corresponding cutouts and edge points on another similar device having its corresponding edge folded. Corner 110 where edges 100, 102 meet and 45 degree split 114 of the edges provides for triangular edge point 118 extending beyond the edge of the LCD screen 108. Additionally, docking cut 106a and LCD screen edge 120 become exposed when edge 100 is folded back.

Figure 2B:
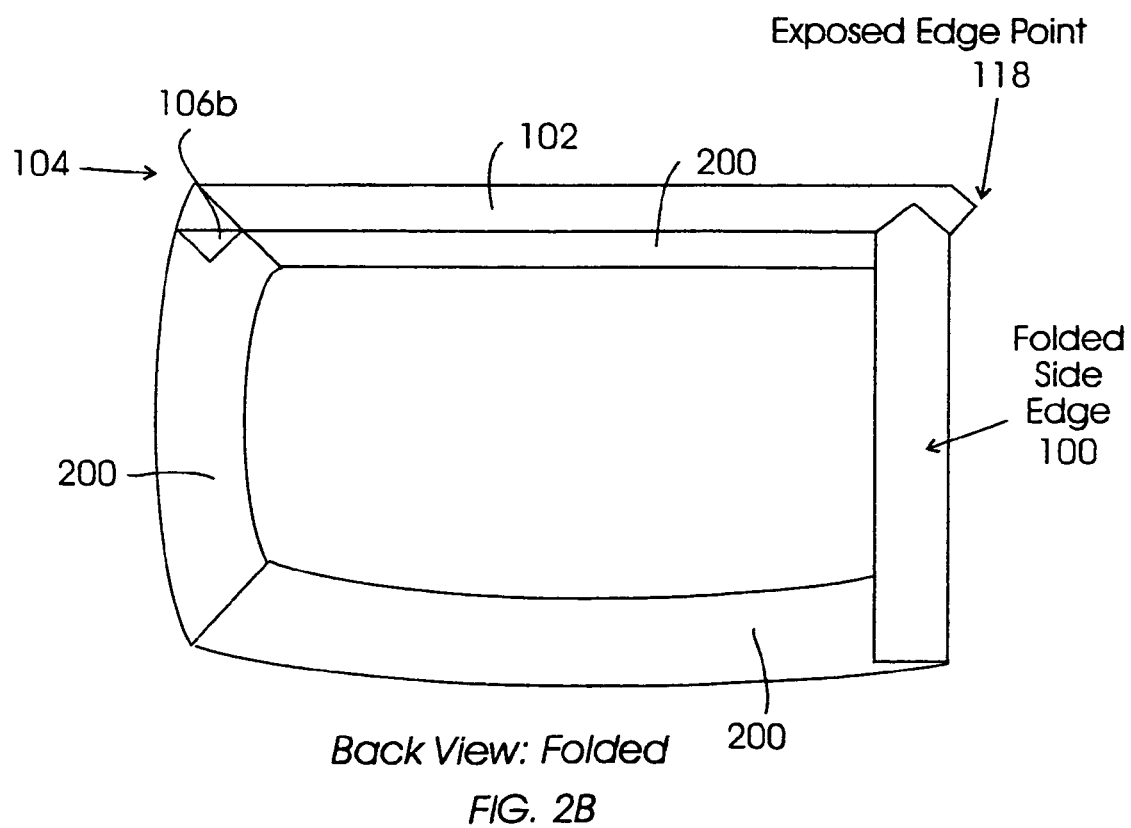
FIG. 2b illustrates a front plan view of an embodiment of the present invention with one edge folded.

FIGS. 2a and 2b illustrate sequential back views of the device shown in FIGS. 1a and 1b having unfolded edges and a folded edge, respectively. As shown, sides 200 of the device are angled. In this manner, when edge 100 or edge 102 is folded under the device, the folded edge does not add thickness to the device.

Figure 2C:
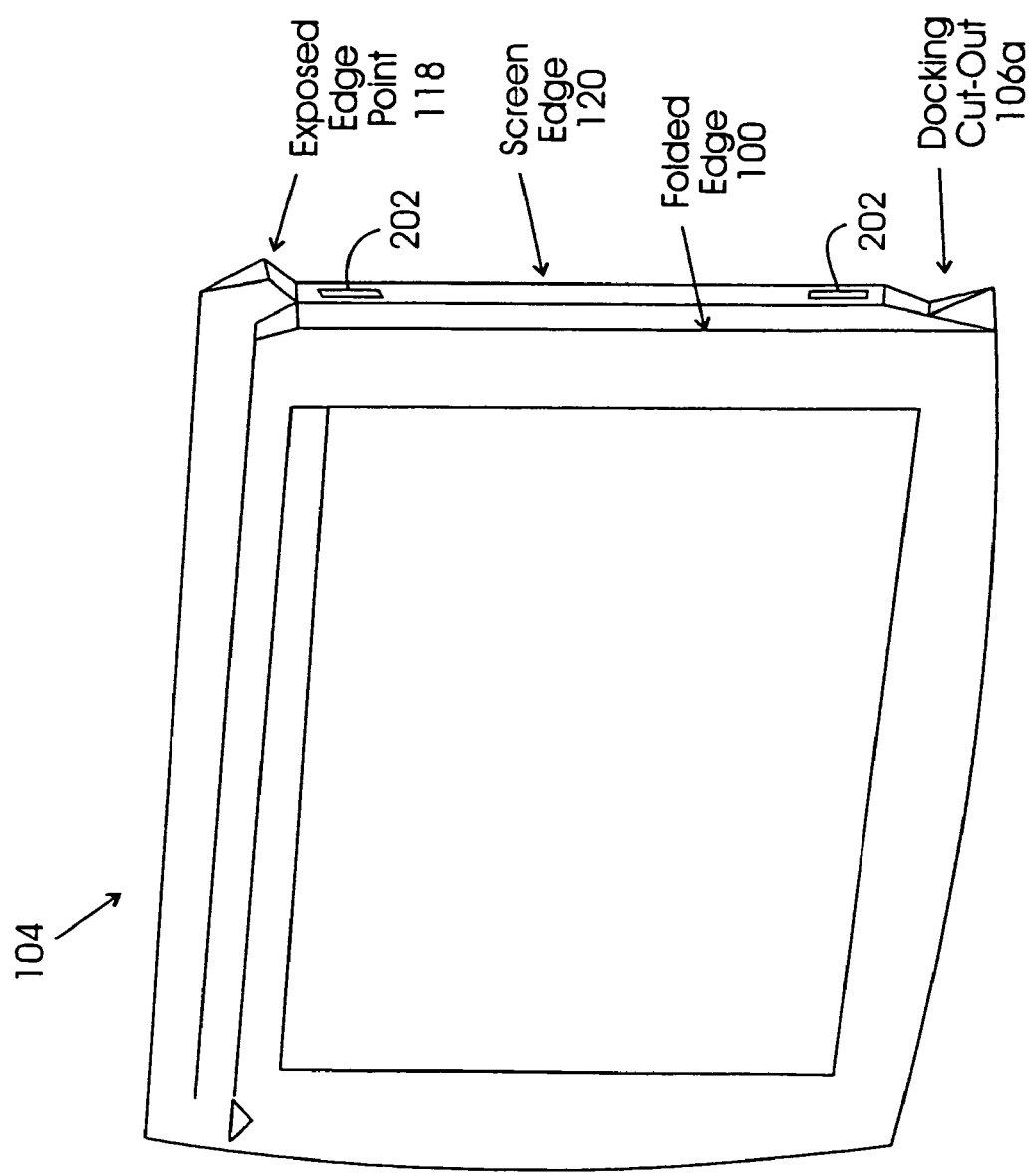
FIG. 2c illustrates a back angled view of an embodiment of the present invention with one edge folded.

A three dimensional back view is illustrated in FIG. 2c which further illustrates male edge point 118, female docking cutout 106, and exposed screen edge 120. Electrical connectors 202 are placed symmetrically across exposed edge 120 whereby a male electrical connector on one side would mate with a female electrical connector on the other device. The exact type (i.e. physical, optical, RF, etc.) and configuration of the connectors is determined by the size and type of device. Electrical connectors may include both power and data busses, or separate connectors may be provided for the power and data busses.

Figure 3:
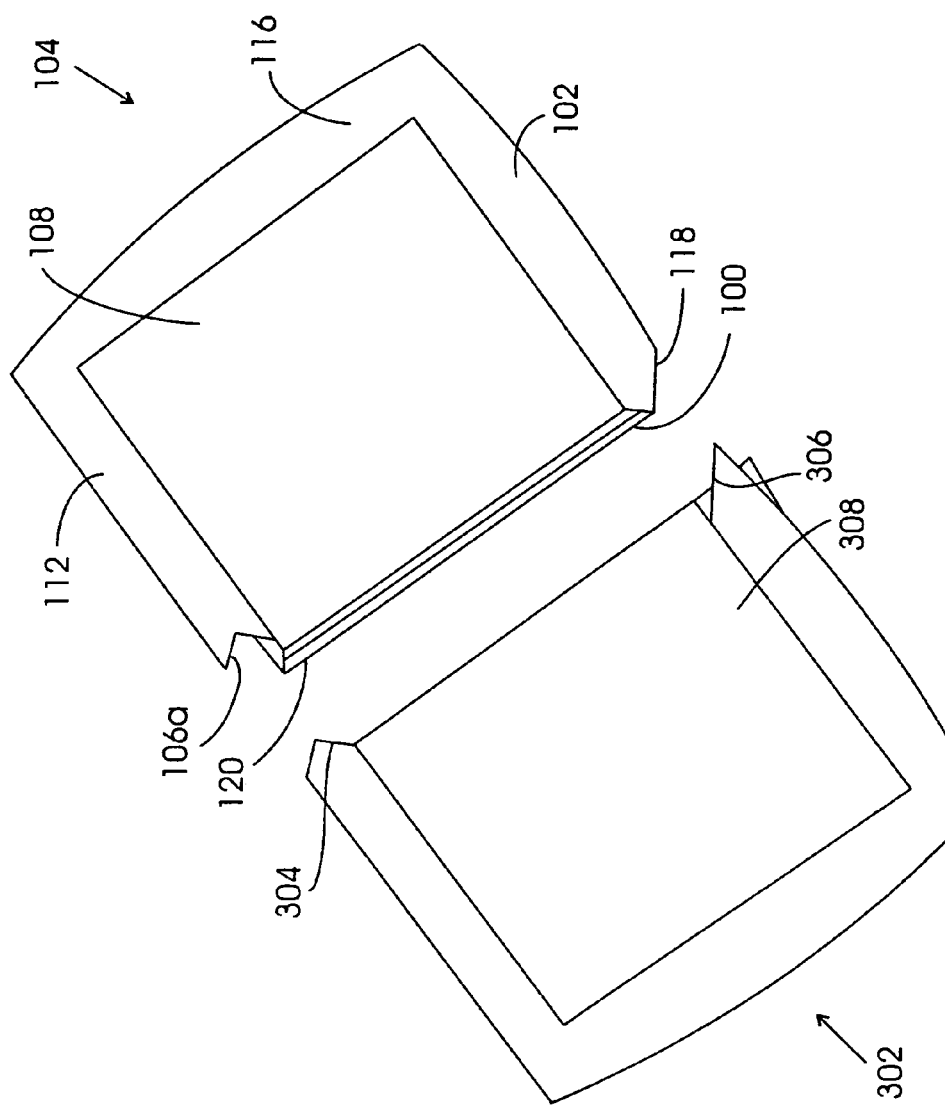
FIG. 3 illustrates docking of two devices of an embodiment of the present invention.

Utilizing mating sections 106a, 118, a second device 302, with a corresponding edge folded down, and the entire device rotated 180 degrees, two devices are capable of being docked together, as is illustrated in FIG. 3. Device 104 has edge 100 folded exposing male edge point 118, female docking cut out 106a and edge 120. Device 302 has a corresponding edge also folded back (not shown) and is rotated 180 degrees such that male edge point 304 of device 302 is aligned to female docking cutout 106a of device 104 and male edge point 118 of device 104 is aligned with female docking cutout 306 of device 302. Electrical connectors 202 (not shown in FIG. 3) are placed symmetrically across the exposed edges whereby a male electrical connector on one device mates with a female electrical connector on the other device. Devices 104 and 302 are physically pushed together and docked. Upon being docked, displays 108, 308 combine to form a single coplanar display surface and the two devices 104, 302 recognize the new configuration and re-map the desktop area of the display into a single display device. The specifics of re-mapping the display are not critical to the understanding of the present invention. Any known or future method of remapping two or more screens into one screen can be used without departing from the scope of the present invention.

The physical and structurally linking of the two devices into a single monolithic device provides the advantage of displaying twice the screen area. Another advantage is obtained when hardware components, such as RAM and CPU cycles, are shared, creating a parallel processing device, that can run more demanding software than each individual unit could alone. Additionally, the physical connection allows for any new information created during the collaborative session to be immediately synchronized between the two devices, bypassing the secondary step of "beaming" information to the other device. The form factor of the linked devices also encourages positive social positioning of the two users in a side by side orientation, reinforcing a collaborative environmental setting.

Figure 4A:
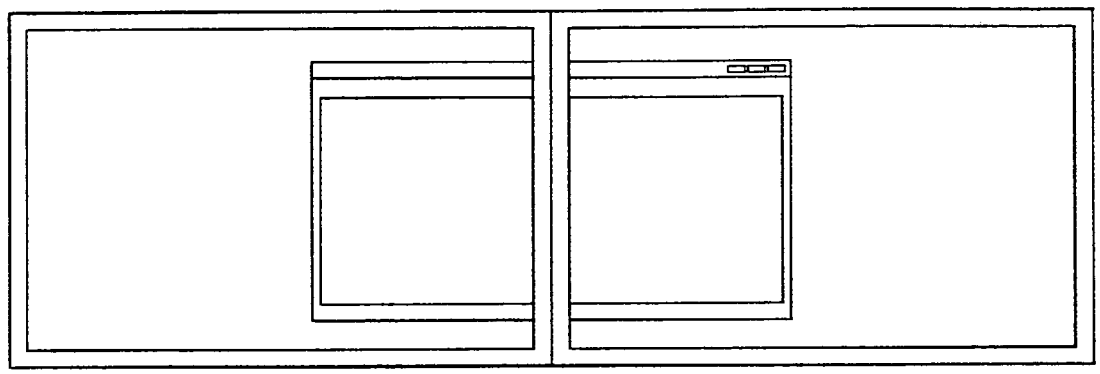
FIG. 4a illustrates a landscape orientation of two docked devices of an embodiment of the present invention.
Figure 4B:
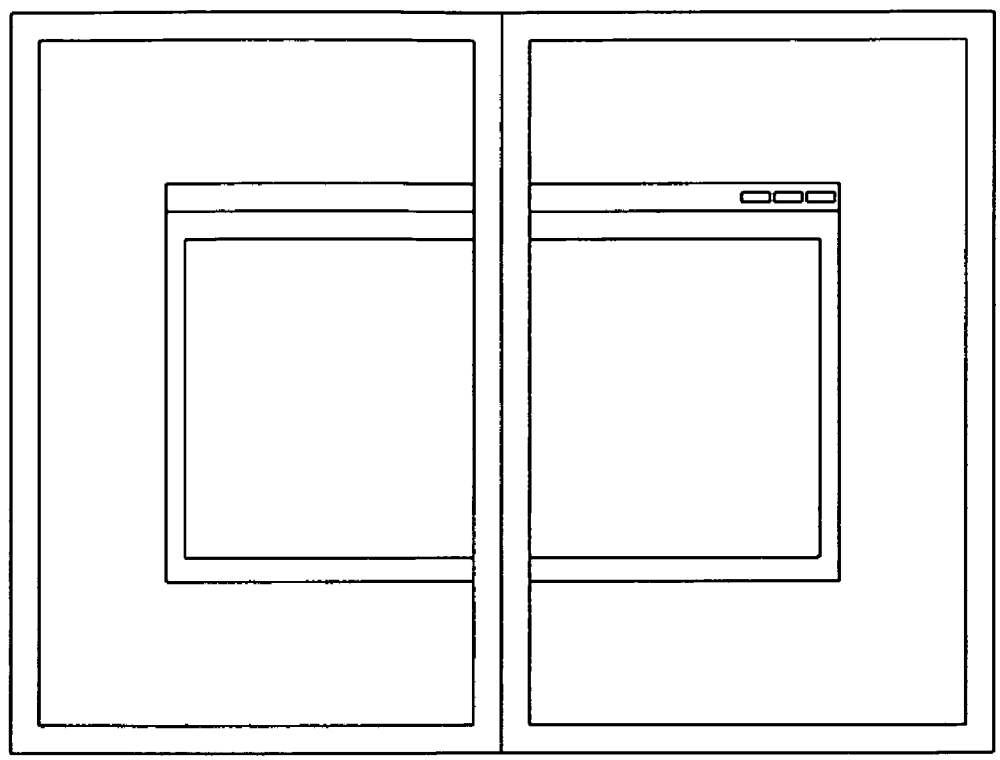
FIG. 4b illustrates a portrait orientation of two docked devices of an embodiment of the present invention.

FIGS. 4a and 4b show two tablet computing devices according to the present invention docked together with their screens re-mapped to a single screen for the combined device. FIG. 4a shows the devices arranged such that a landscape orientation is produced. FIG. 4b shows the devices arranged such that a portrait orientation is produced.

Figure 5A:
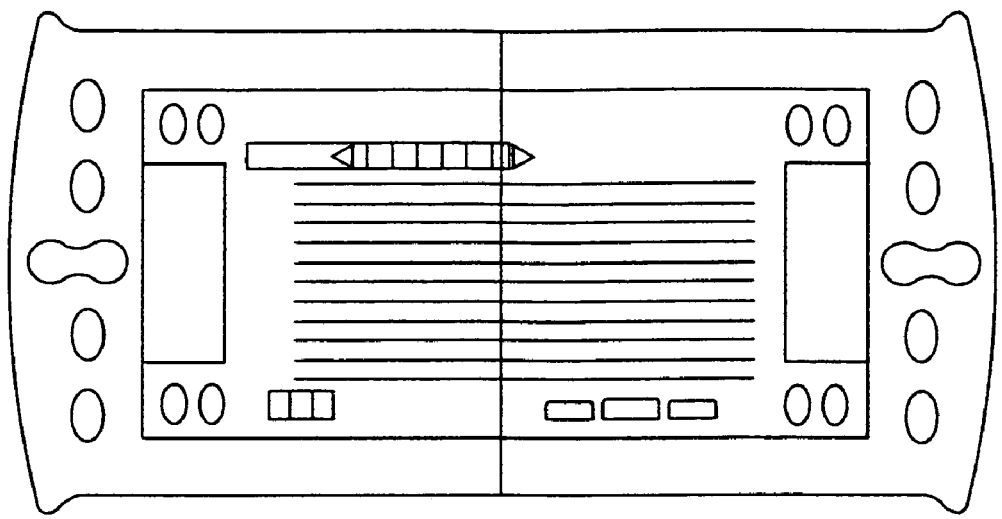
FIG. 5a illustrates a landscape orientation of two docked devices of an embodiment of the present invention utilizing PDAs.
Figure 5B:
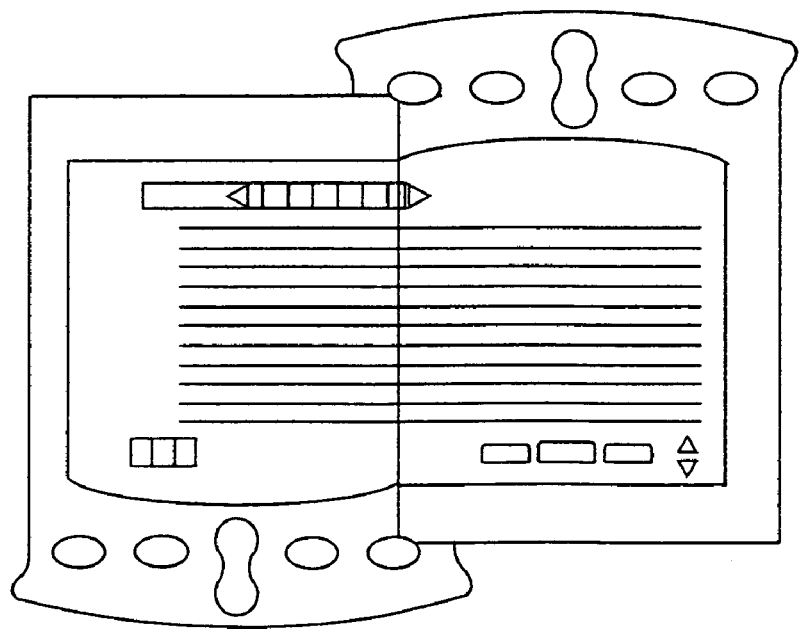
FIG. 5b illustrates a portrait orientation of two docked devices of an embodiment of the present invention utilizing PDAs.

FIGS. 5a and 5b illustrate the use of the present invention in so-called "personal digital assistant" (PDA) computing devices. FIG. 5a illustrates two such equipped devices arranged in a landscape orientation, while FIG. 5b illustrates the devices arranged in a portrait orientation.

While specific structures and shapes have been illustrated by the present disclosure, i.e. the structural docking points are located at opposite ends of the exposed edge and having a male-female relationship, the present invention should not be deemed limited by such disclosure. Other manners of providing a structural link, dependent upon the specific tablet form factor, can be utilized. Additionally, while a triangular shape has been illustrated for the structural docking points, other shapes can be used in a manner advantageous to the specific tablet form factor device being utilized. In addition, the embodiments have illustrated only two devices combined, however, the present invention is not limited thereto. More than one device is able to be combined with a device when more than one edge with electrical and structural connectors are exposed at the same time.

CONCLUSION

A system and method has been shown in the above embodiments for the implementation of a tablet form factor device capable of being docked with a like device to increase display size and computing power. While various embodiments have been shown and described, it will be understood that there is no intent to limit the invention by such disclosure, but rather, it is intended to cover all modifications and alternate constructions falling within the spirit and scope of the invention, as defined in the appended claims.

The invention claimed is:

1. A portable computer display device including one or more mating sections for docking with similar portable computer display devices, said display device comprising:
   a computer display with associated supporting cabinet structure;
   said associated supporting cabinet structure having one or more movable exterior sides, where one or more corresponding edges of said display are selectively exposed, said edges exposed by removing or temporarily displacing one or more of said movable exterior sides which protect said one or more exposed display edges, said supporting cabinet additionally comprising one or more structural connectors for structurally mating to said similar device;
   at least one electrical connector disposed within said associated supporting cabinet structure and proximate to said one or more exterior sides, said at least one electrical connector capable of connecting in a mating relationship with a corresponding electrical connector in said similar portable display device,
   said one or more exposed display edges abutting in a substantially coplanar configuration to a corresponding exposed display edge of said second similar portable device when said electrical connectors are connected and said computer display logically re-mapped to be part of a single display comprising the displays of both devices.

2. A portable computer display device including one or more mating sections for docking with similar porvable computer display devices, as per claim 1, wherein said portable computer display device shares processing power when connected to said similar portable computer display device.

3. A portable computer display device including one or more mating sections for docking with similar portable computer display devices, as per claim 1, wherein said display is substantially rectangular in shape and a first one of said two exterior sides extends along a length of said display while a second one of said two exterior sides extends along a width of said display.

4. A portable computer display device including one or more mating sections for docking with similar portable computer display devices, as per claim 3, wherein said portable display device is connected to said similar portable display device along said first one of said two exterior sides providing a portrait orientation display.

5. A portable computer display device including one or more mating sections for docking with similar portable computer display devices, as per claim 3, wherein said portable display device is connected to said similar portable display device along said second one of said two exterior sides providing a landscape orientation display.

6. A portable computer display device including one or more mating sections for docking with similar portable computer display devices, as per claim 1, wherein said said displacement is performed by folding said one or more movable exterior sides which protect said one or more exposed display edges towards a back surface of said supporting cabinet.

7. A portable computer display device including one or more mating sections for docking with similar portable computer display devices, as per claim 6, wherein said one or more movable exterior sides are connected to said supporting cabinet structure via one or more hinges.

8. A portable computer display device including one or more mating sections for docking with similar portable computer display devices, as per claim 1, wherein data processed by said connected devices is synchronized prior to disconnection of said devices.

9. A portable computer display device including one or more mating sections for docking with similar portable computer display devices, said display device comprising:
   a computer display with associated supporting cabinet structure having a display surface;
   said associated supporting cabinet structure having one or more movable side sections where a corresponding edge of said display is selectively exposed by displacing a movable side section;
   at least one electrical connector disposed within said movable side section along said edge;
   at least one physical mating element disposed on said cabinet along said exterior edge;
   wherein said electrical connector and mating element are disposed such that when said device is docked with a second similar portable display device, via a mating electrical connector and a mating element disposed along a side of said second device having a corresponding exposed display edge, said display edges are substantially contiguous and the display surfaces of said devices are substantially coplanar.

10. A portable computer display device including one or more matins sections for docking with similar portable computer display devices, as per claim 9, wherein the displays of said connected devices are logically re-mapped to provide a single display for said connected devices.

11. A portable computer display device including one or more mating sections for docking with similar portable computer display devices, as per claim 9, wherein said portable computer display device shares processing power when docked with said similar portable computer display device.

12. A portable computer display device including one or more mating sections for docking with similar portable computer display devices, as per claim 9, wherein said display is substantially rectangular in shape said movable side section extends along a longer edge of said display such that when said portable display device is connected to said similar portable display device the displays provide a portrait orientation.

13. A portable computer display device including one or more mating sections for docking with similar portable computer display devices, as per claim 9, wherein said display is substantially rectangular in shape and said movable side section extends along a shorter edge of said display such that when said portable display device is connected to said similar portable display device the displays provide a landscape orientation.

14. A portable computer display device including one or more mating sections for docking with similar portable computer display devices, as per claim 9, wherein said exposed display edge is exposed by removing said movable side section which extends along said display edge.

15. A portable computer display device including one or more mating sections for docking with similar portable computer display devices, as per claim 9, wherein said exposed display edge is exposed by folding said movable side section which extends along said display edge towards a back surface of said supporting cabinet.

16. A portable computer display device including one or more mating sections for docking with similar portable computer display devices, as per claim 15, wherein said folding cabinet section is attached to said support cabinet via one or more hinges.

17. A portable computer display device including one or more mating sections for docking with similar portable computer display devices, as per claim 9, wherein said portable computer display device synchronizes data processed by said connected devices prior to disconnection of said devices.

18. A portable computing device including a display having a display surface, said device capable of being mated with a similar device such that the display surfaces of each device form a single display surface, said device comprising:

a housing having a back surface and at least first, second, and third exterior edges enclosing said display such that said display surface is exposed for viewing;

said first housing edge extending along a first edge of said display, a first end of said first housing edge adjoining a portion of said second housing edge extending beyond a second edge of said display, said first housing edge being foldable towards said back surface to expose said first display edge;

said portion of said second edge extending beyond said second edge of said display having a specified geometric shape when said first housing edge is folded towards said back surface;

said third edge including a reciprocal mating section at an end of said third edge adjoining a second end of said first housing edge opposite said first end, said reciprocal mating section having a geometric shape substantially identical to said specified geometric shape;

wherein when said first edge is folded towards said back surface, said portable device is capable of being mated with a second similar portable device utilizing said portion of said second edge extending beyond said second edge of said display and said reciprocal mating section such that said first display edge is adjacent an exposed display edge of said second similar portable device.

\* \* \* \* \*